Oct. 2, 1962 — L. D. HARMES — 3,056,155
PIPE TREATING APPARATUS
Filed July 18, 1960 — 2 Sheets-Sheet 1
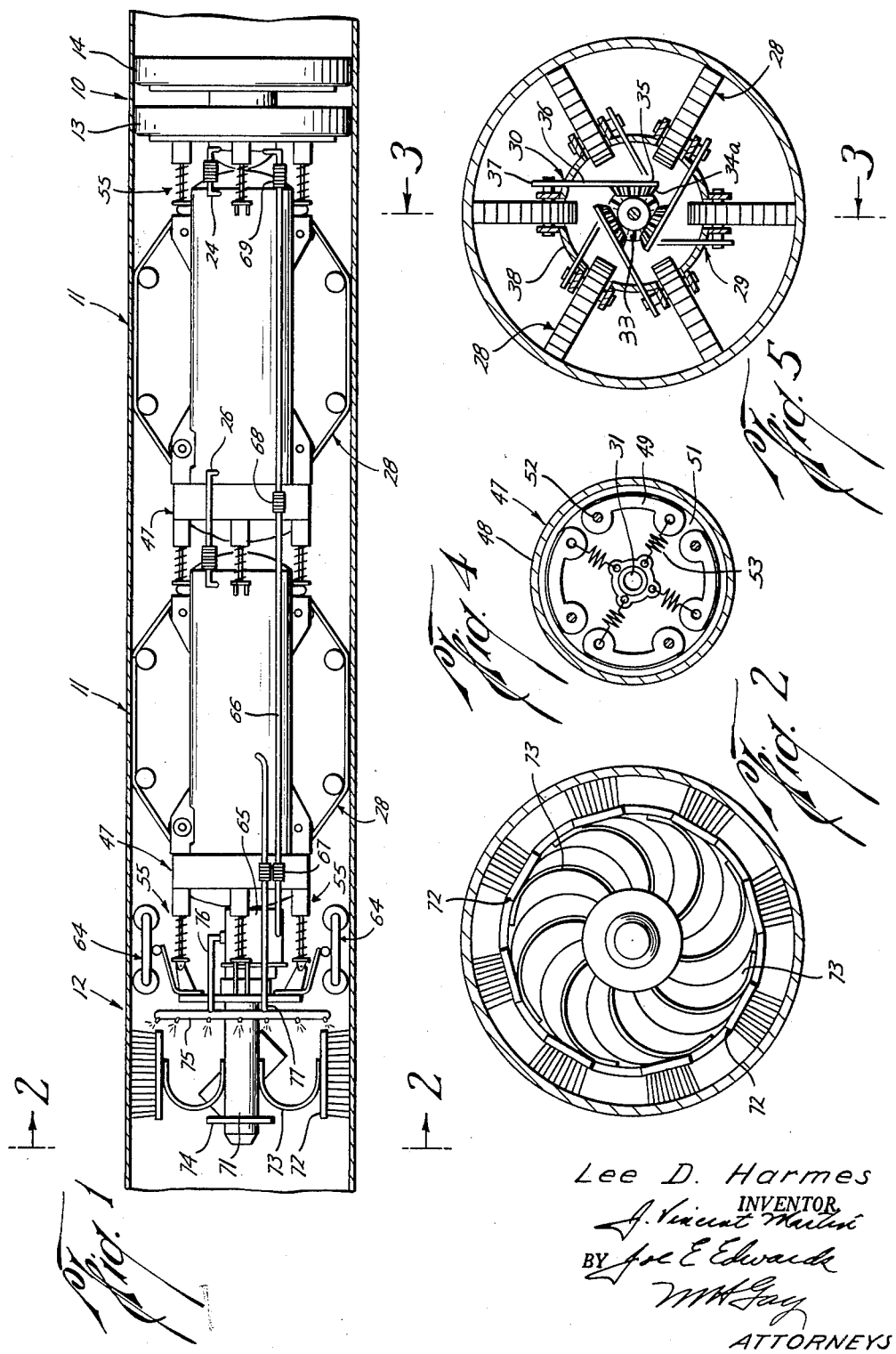
Lee D. Harmes
INVENTOR
BY
ATTORNEYS

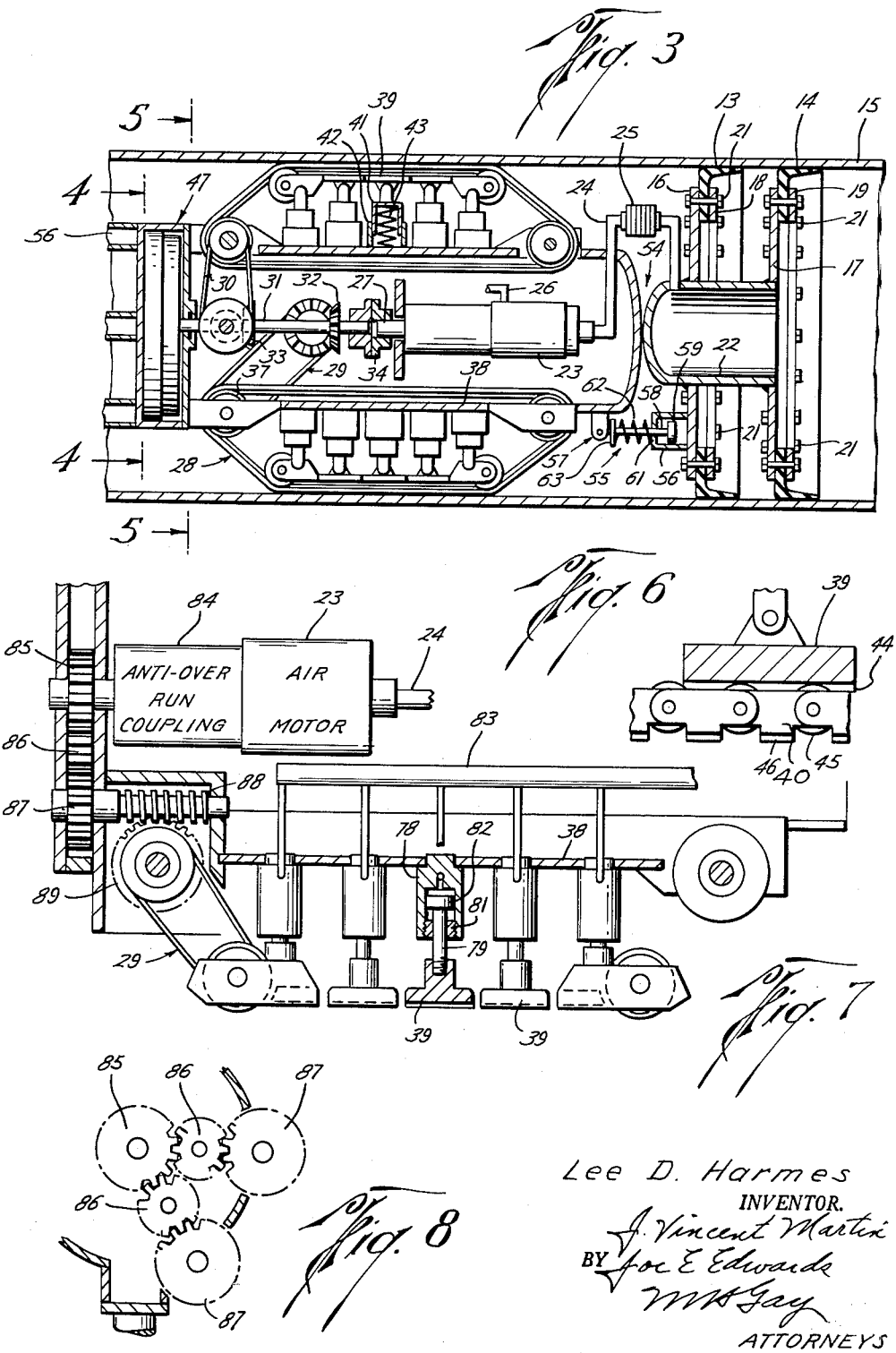

3,056,155
PIPE TREATING APPARATUS
Lee D. Harmes, Houston, Tex., assignor to Mission Manufacturing Company, Houston, Tex., a corporation of Texas
Filed July 18, 1960, Ser. No. 43,473
6 Claims. (Cl. 15—104.06)

This invention relates to apparatus used in treating pipe, and more particularly to apparatus used in treating pipe in place in the ground.

While the apparatus of this invention may be used in any circumstance in which it is desired to move an object through a pipe, such as means for painting the interior of the pipe, taking a picture of the pipe, etc., it is illustrated as including a cleaning apparatus, and the discussion herein will be limited to its use as a cleaning apparatus for pipe.

For some time it has been known that it is desirable to coat the interior of pipelines to reduce corrosion and frictional drag to flow of fluid through the pipe.

While some pipe has been treated in this manner, the art is still seeking a practical, economical means of cleaning and coating pipelines in place in the ground.

Prior to coating a pipeline, it must be thoroughly cleaned. To best accomplish this purpose, the cleaning apparatus which may include scrapers, brushes, or the like, should be caused to move slowly through the pipe with the cleaning devices rotating at high speed so that a spiral-like motion is attained by the brushes to obtain maximum results.

After the pipe has been cleaned, then a pipe-coating apparatus should be run through the pipe to apply the coating. By this invention there is provided apparatus which economically and practically accomplishes these ends.

It is not an infrequent occurrence that objects being passed through a pipeline tend to hang up. When this occurs, pressure, which is used to propel the apparatus, tends to build up behind the apparatus and when the pressure increase dislodges the apparatus from the obstruction, the apparatus tends to jump ahead in the pipeline at a very rapid rate of travel until the pressure within the pipeline behind the apparatus has been reduced. This results in improper treatment of the section of the pipe in which the apparatus jumped.

An object of this invention is to provide a practical, economical apparatus for moving through a pipe at a constant rate.

Another object is to provide apparatus for moving through a pipe which will not jump ahead when dislodged from an obstruction.

Another object is to provide apparatus for moving through a pipe in which the apparatus is normally braked as it moves through a pipe, and when the device slows or stops additional power is applied to drive the apparatus ahead.

Another object is to provide an apparatus for moving through a pipe at a constant speed in which the primary power for moving the apparatus is provided by maintaining a pressure differential across the apparatus, and in which a speed controller applies a braking force to limit movement of the apparatus to a constant speed through a pipe, and in which the speed controller applies additional force to drive the apparatus upon its slowing down or stopping.

Other objects, features and advantages of the invention will appear from a consideration of the specification, drawings and claims.

In the drawings, wherein illustrated embodiments of this invention are shown, and wherein like reference numerals indicate like parts:

FIGURE 1 is a schematic illustration of apparatus employing this invention shown moving through a pipeline;

FIGURE 2 is a view taken along the lines 2—2 of FIGURE 1;

FIGURE 3 is a view partly in elevation and partly in cross section of the speed controller and separator shown schematically in FIGURE 1;

FIGURE 4 is a view taken along the lines 4—4 of FIGURE 3;

FIGURE 5 is a view taken along the lines 5—5 of FIGURE 3;

FIGURE 6 is a view partly in elevation and partly in cross section through a fragment of one of the guide shoes and endless track;

FIGURE 7 is a fragmentary view of a speed controller such as illustrated in FIGURE 3 showing a modified form of this invention; and FIGURE 8 is a fragmentary front end view of the speed controller of FIGURE 7 with the front housing removed.

Referring first to FIGURE 1, the pipe treating apparatus illustrated includes means indicated generally at 10 for separating the pipeline being treated into upstream and downstream portions. The differential across the separating means 10 serves to propel the apparatus and to permit pressure fluid from the upstream side being used to operate fluid motors, as will hereinafter more fully appear.

A pair of speed controllers are indicated generally at 11 and are connected to the separator means. These speed controllers might be placed upstream or downstream of the separator means and function primarily to brake the entire apparatus as it moves through a pipe and maintain progress at a substantially fixed rate. In the event the apparatus slows or stops for any reason, the speed control means provides additional power to drive the apparatus forward at the fixed rate.

At the front end of the apparatus a treating device is indicated generally at 12. While the illustrated device is utilized to clean the pipeline, it is apparent that any other desired device could be substituted for the cleaning device to accomplish the desired function. For instance, a painting device might be propelled through the pipeline by the apparatus, or detecting device such as closed circuit television, sonic device, measuring device, etc. might be substituted for the cleaning device. The particular arrangement of the separator means, speed control means, and pipe treating means relative to each other in the pipe would depend upon the job being performed and the best arrangement of these components for carrying out this job.

Reference is additionally made to the other figures of the drawings at this time wherein the details of construction of the apparatus are shown.

Referring first to the means for separating the pipeline into upstream and downstream portions, it will be noted from FIGURE 7 that a plurality of lip-type seals 13 and 14 engage the pipe 15 to seal therewith. The lip seals 13 and 14 are of the conventional cup-shape and are carried by suitable supports or holders 16 and 17, respectively. The cup seals 13 and 14 are secured to supports 16 and 17 by clamp rings 18 and 19, respectively, which are secured in place by a plurality of bolts 21. Desirably, an air collection chamber is provided for fluid to operate air motors, and this chamber may be provided by the central support 22 on which the seal supports 16 and 17 are mounted. As shown, the collection chamber is provided by the member 22 being tubular in form and open to the upstream side of the pipe and closed to the downstream side of the pipe.

Referring now to the speed control means, this portion of the apparatus includes a rotatable means bearing against the pipe to act as a brake or drive which is connected to the output of fluid motor 23. The fluid motor 23 is connected to the collection chamber by a conduit 24 which includes as a portion thereof a flexible section 25 which may be provided by a bellows. This permits both bending and expansion, as well as contraction, movement in the conduit.

The fluid motor 23 may take any desired form which is capable of having its speed regulated to a constant value. By way of example, Model 9 RM 11 Fluid Motor of Ingersol-Rand Company of New York, New York, might be utilized in the FIGURE 3 embodiment. Exhaust fluid from the motor might be carried through conduit 26 to fluid motors of additional speed control units connected in tandem in the apparatus as shown in FIGURE 1. It is, of course, obvious that fluid from each fluid motor might be immediately exhausted to downstream and separate source lines provided to connect each fluid motor to the collecting chamber, if desired. In any event, each fluid motor is governed to provide a constant r.p.m. output which will be utilized to provide a brake for controlling the rate of travel of the entire apparatus, and if the apparatus slows for any reason, the output of the motor will provide additional power to drive the apparatus.

Any desired type of regulating device may be utilized to control the r.p.m. of the fluid motor, such as weight controls, valves, etc.

The output shaft 27 of the fluid motor is connected to the means for rotatably engaging the pipe which in the illustrated embodiment is provided by the endless track indicated generally at 28. This connection may be made in any desired manner as by the chain and sprocket drives indicated generally at 29 and 30. It will be noted from FIGURE 5 that a plurality of rotatable means 28 are utilized on each speed controller. To accommodate a large number of chain drives, provision is made for driving from two spaced points on the drive shaft 31 by gears 32 and 33 thereon. The drive shaft is connected to the output shaft of motor 27 by a suitable coupling 34.

As best seen in FIGURE 5, each of the chain drives 29 and 30 includes a gear 34a driven by one of gears 32 or 33 and having formed therewith a drive sprocket 35. A chain 36, driven by sprocket 35, drives sprocket 37 which is carried by an endless chain drive roller on which the endless belt 28 runs. (See FIG. 3.)

The rotatable means provided by the endless chain 28 may be mounted on the body 38 of the speed controller in any desired manner. For instance, a plurality of guide shoes 39 may be carried by supports including a sleeve 41 which telescopes within a sleeve 42 on body 38 and is urged radially outward by compression spring 43.

As best seen in FIGURE 6, the guide shoe 39 has a longitudinal U-shaped groove 44 therein, in which the rollers 45 of the endless track move. Thus the guide shoes function to both maintain the endless track 28 in position and to urge it firmly against the wall of the pipe. Preferably, the endless track is provided on each pipe-engaging section 40 with a material 46 having a high coefficient of friction with steel so that it will be difficult, if not impossible, to drag the endless track across the surface of the pipe.

As noted hereinabove, the fluid motor may be provided with a governor which will prevent its over-speeding and, inasmuch as the endless track 28 is geared to the output of the fluid motor, the fluid motor would in effect act as a brake to limit the speed of the apparatus. Such a speed control is needed because it is desirable to use a differential across the separator means on the order of 50 p.s.i., or more. This pressure exerted across the cross-sectional area of a large diameter pipe creates a substantial force and would move the apparatus through the pipe at a much faster rate than desired. Therefore, one or more of the speed controllers would be utilized to act as a brake and limit the speed of the apparatus.

If desired, other means may be provided in addition to the governor referred to above for limiting rotation of the endless track to a predetermined r.p.m. Several such means are shown herein, and any combination thereof with each other or with other types of speed control means may be employed. In the FIGURE 3 embodiment a friction brake device indicated generally at 47 is provided to limit the speed of rotation of shaft 31. In this device a brake drum 48 is positioned over a plurality of centrifugal brake shoes 49 which are carried on mounted plate 51 which is non-rotatably secured to shaft 31. Each of brake shoes 49 is pivotally mounted at 52 and is urged inwardly by a tension spring 53. As the speed of the motor tends to increase over the predetermined rate, the brake shoes fly out into engagement with the brake drum and assist the governor of the fluid motor in limiting speed of the endless track 28 to the desired rate. For reasons of safety, it is preferred that at least two speed-limiting devices be employed on each speed controller.

In the event the apparatus tends to hang up in the pipeline due to an obstruction, the slowing down of endless track 28 will naturally slow the fluid motor output shaft 27. Upon this occurrence the fluid motor will cease acting as a brake and will begin acting as a drive motor, and its output will be available to assist the fluid pressure behind the separator means 10 in moving the apparatus past the obstruction. When such an obstruction is passed, there is a tendency for the apparatus to jump ahead a considerable distance. This tendency will be substantially reduced, if not entirely eliminated, by the speed controller immediately beginning to act as a brake upon coming up to a predetermined rate of travel.

Normally the separator means 10 will be pushing against the speed controller 11, and this force is transmitted from the nose of the cylinder support 22 of the separator means to the rear of the body 38 of the speed controller, as indicated generally at 54.

If for any reason the speed controller tends to pull away from the separator means, such as for instance upon the separator means 10 tending to stick, the plurality of lost motion connections 55 will come into place and connect the speed controller and separator means together. Each of these lost motion connections includes a housing 56 carried by the separator support 16. Attached to the body of the speed controller through a suitable linkage indicated at 57 is a rod 58 having an enlargement 59 on its end within member 56. The enlargement 59 engages the closed end 61 of the member 56 when the speed controller and fluid separator leave each other to limit their movement away from each other to a small amount. A compression spring 62 is provided between a stop 63 on rod 58 and the closed end 61 of member 56 which acts as a cushion or shock absorber as the speed controller and separator means move toward each other.

The cleaning device 12 may take any desired form. In order to obtain maximum cleaning, the device preferably includes a plurality of cleaning means mounted for rotation so that the cleaning means will move forward in a spiral manner to thoroughly clean the pipe. In the illustrated embodiment a plurality of dollies indicated generally at 64 are secured to the forward end of the lead speed controller 11 by shock absorber means which are identical to those previously discussed and indicated generally at 55, and therefore these shock absorbers are also given the identifying numeral 55. Mounted on the dolly is a fluid motor 65 receiving fluid through line 66 which is provided with a plurality of bellows sections 67, 68 and 69 and receives fluid from the collection chamber provided by the member 22. This fluid motor is also preferably one which can be set to rotate at a given r.p.m. and the Ingersol-Rand Motor previously identified may be used for this purpose. The motor 65 drives the arbor 71 on which there is mounted a plurality of wire brushes 72 by leaf springs 73. As best shown in FIGURE 1, these brushes are canted at an angle so as to tend to throw dislodged particles forward of the apparatus. As noted in FIGURE 2, a large number of these brushes are preferably used. If desired, knives or scrapers of the type generally used in cleaning pipe may be affixed to mounting ring 74 to precede the brushes, or they may be used in place of the brushes.

In order to keep the brushes clean and to assist in driving removed or loosened particles ahead of the apparatus, a dispersal ring 75 is provided immediately rearward of the brushes 72. Preferably, all air from the several air motors is exhausted through conduits 76 and 77 to the dispersal ring and thence directed adjacent the brushes to keep them clean and to drive loosened particles ahead of the apparatus.

Referring now to FIGURES 7 and 8, a modified form of speed controller is illustrated. The speed controller is identical to the controller shown in FIGURE 3 with the exception that the resilient means for urging the guide shoes outwardly differs, and the centrifugal brake 47 is replaced by other means for limiting the speed of rotation of the endless track 28 to the speed of the fluid motor 23.

Referring first to the guide shoe mounting, a cylinder 78 is carried by body 38. Each guide shoe is mounted on a connecting rod 79 which extends through a closure member 81 into one of the cylinders 78. Each connecting rod 79 has a piston 82 thereon and fluid from the upstream side of the separator means is lead to these several cylinders through manifold 83 which is connected to the gathering chamber provided by body 22 of the separator means. The air thus fed to the cylinder 78 resiliently urges the several guide shoes radially outward into engagement with the pipe.

Referring now to the means for preventing back feed torque from the rotatable means to the fluid motor from over-speeding the fluid motor, it will be noted that the air motor 23 is connected to an anti-overrun coupling 84. This may be a coupling of the type sold by the Formsprag of Warren (Detroit) Michigan, and known as the Revlok device. This device prevents over-speeding of the output shaft and eliminates back feed torque from the driven equipment to the power source. Thus, the speed controller is limited to the speed determined by the setting of air motor 23.

As an additional type of device for eliminating back feed torque, a non-reversible gearing may be employed. In the FIGURE 7 embodiment, the output from the anti-overrun coupling is fed through a drive gear 85 to an idler gear 86 and thence to a driven gear 87. The driven gear rotates worm 88 which in turn drives gear 89. It will be apparent from the drawing that the relationship of gears 88 and 89 is of the self-locking type and back feed direct from the endless track 28 will not be capable of rotating worm drive 88. In FIGURE 8, an end view shows the manner in which the drive gear 85 may be related with a number of idler and driven gears to cooperate with several endless tracks 28.

In operation, the apparatus is inserted into a pipeline through any suitable connection such as a pig trap and pressure built up behind the apparatus in any desired manner. If very high pressure gas is used, there may be present fluid under substantial pressure downstream of the device. For instance, the apparatus might be inserted into a line in which fluid is being transmitted. In this event, the speed controllers would be set to permit forward movement of the apparatus utilizing the differential which would be built up across the apparatus before it would move forward. Where compressor gas is used, it is preferred not to have any back pressure present.

The differential acting against the relatively large diameter separator means 10 will drive the apparatus forward. The fluid passing to the fluid motors of the speed controllers will operate the speed controllers at speeds for which they are set before the device is introduced into the pipeline. The several means employed to brake the endless track 28, such as the governor on the air motor, the centrifugal brakes, the non-reversible gears, etc., will act to limit rotation of the endless track and will permit rotation of the endless track at no more than the speed called for by the speed of the fluid motors.

Upstream fluid will be fed to the air motor 65 associated with the cleaning means, and will rotate the cleaning means to thoroughly clean the pipe. The exhaust fluid from the several fluid motors will be directed by dispersal ring to the vicinity of the cleaning brushes and will help clean these brushes and drive ahead of the apparatus the loosened particles.

While particular types of apparatus have been illustrated, it will be understood that the invention is not limited to the particular apparatus shown. For instance, there are well known equivalents for the separator means, such as the spheroid balls frequently used in devices in pipelines, and they might be substituted for the separator 10. While the endless track 28 is employed on each speed control means, it will be apparent that other rotatable means such as one or more wheels might be utilized instead of the endless track. As noted hereinabove, any desired means may be used to limit the speed of rotation of the rotatable means responsive to the speed of operation of the fluid motors. Of course, any desired type of fluid motor may be used which has an output which can be coupled with the rotatable means to drive and to provide a brake or control for a brake to thus limit speed of the speed controller.

Any pipe treating means which it is desired to take through a pipe in a controlled manner may be substituted for the pipe cleaning means 12. Of course, the pipe cleaning means may take many different forms, and the means 12 illustrated is merely a preferred type of pipe cleaner.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. Apparatus for treating horizontally extending pipe comprising: separator means movable in the pipe and adapted to separate the pipe into upstream and downstream sections; speed control means connected to the separator means including, a fluid motor receiving fluid from the upstream side of the separator means and exhausting fluid to the downstream side of the separator means, rotatable means connected to the output shaft of the fluid motor for frictionally engaging the inner wall of the pipe and driving or braking the speed control means, and means preventing back-feed torque from the rotatable means to the fluid motor from over-speeding the fluid motor to limit the rate of travel of the speed-control means; and means connected to the speed control means for treating the wall of the pipe.

2. Apparatus for treating horizontally extending pipe comprising: separator means movable in the pipe and adapted to separate the pipe into upstream and downstream sections; speed control means connected to the separator means including, a fluid motor receiving fluid from the upstream side of the separator means and exhausting fluid to the downstream side of the separator means, rotatable means connected to the output shaft of the fluid motor for frictionally engaging the inner wall of the pipe and driving or braking the speed control means, and means preventing back-feed torque from the rotatable means to the fluid motor from over-speeding the fluid motor to limit the rate of travel of the speed-control means; and a cleaning device connected to the speed control means including, a plurality of rotatably mounted cleaning elements, and a fluid motor driving the cleaning elements and receiving fluid from the upstream side of the separator means and discharging fluid in the vicinity of the cleaning elements to blow cleaned particles ahead of the device.

3. The apparatus of claim 2 wherein fluid exhausted by both fluid motors is discharged through a dispersal ring in the vicinity of the cleaning element.

4. Apparatus for treating horizontally extending pipe comprising: separator means movable in the pipe and adapted to separate the pipe into upstream and downstream sections; speed control means connected to the separator means including, a fluid motor receiving fluid from the upstream side of the separator means and exhausting fluid to the downstream side of the separator means, rotatable means connected to the output shaft of the fluid motor for frictionally engaging the inner wall of the pipe and driving or braking the speed control means, and means preventing back-feed torque from the rotatable means to the fluid motor from over-speeding the fluid motor to limit the rate of travel of the speed-control means.

5. Apparatus for treating horizontally extending pipe comprising: separator means movable in the pipe and adapted to separate the pipe into upstream and downstream sections; speed control means connected to the separator means including, a fluid motor receiving fluid from the upstream side of the separator means and exhausting fluid to the downstream side of the separator means, a plurality of endless tracks spaced circumferentially about the speed control means and connected to the output shaft of the fluid motor for frictionally engaging the inner wall of the pipe and driving or braking the speed control means, guide shoe means engaging the track and including resilient means urging the shoes of the guide shoe means radially outward to hold the endless track in firm engagement with the wall of the pipe, and means preventing back-feed torque from the rotatable means to the fluid motor from over-speeding the fluid motor to limit the rate of travel of the speed control means.

6. Apparatus for treating horizontally extending pipe comprising: separator means movable in the pipe and adapted to separate the pipe into upstream and downstream sections; speed control means connected to the separator means including, a fluid motor receiving fluid from the upstream side of the separator means and exhausting fluid to the downstream side of the separator means, a plurality of endless tracks spaced circumferentially about the speed control means and connected to the output shaft of the fluid motor for frictionally engaging the inner wall of the pipe and driving or braking the speed control means, guide shoe means engaging the track and including resilient means urging the shoes of the guide shoe means radially outward to hold the endless track in firm engagement with the wall of the pipe, and means preventing back-feed torque from the rotatable means to the fluid motor from over-speeding the fluid motor to limit the rate of travel of the speed control means; and a cleaning device connected to the speed control means including, a plurality of rotatably mounted cleaning elements, and a fluid motor driving the cleaning elements and receiving fluid from the upstream side of the separator means and discharging fluid in the vicinity of the cleaning elements to blow cleaned particles ahead of the device.

References Cited in the file of this patent

UNITED STATES PATENTS

| | | |
|---|---|---|
| 645,894 | Dean | Mar. 20, 1900 |
| 1,634,591 | McGeehin | July 5, 1927 |
| 1,976,990 | Guthrie | Oct. 16, 1934 |
| 2,418,880 | Haynes et al. | Apr. 15, 1947 |